(12) United States Patent
Lawrence

(10) Patent No.: US 8,121,937 B2
(45) Date of Patent: *Feb. 21, 2012

(54) GAMING INDUSTRY RISK MANAGEMENT CLEARINGHOUSE

(75) Inventor: David Lawrence, New York, NY (US)

(73) Assignee: Goldman Sachs & Co., New York, NY (US)

( * ) Notice: Subject to any disclaimer, the term of this patent is extended or adjusted under 35 U.S.C. 154(b) by 1179 days.

This patent is subject to a terminal disclaimer.

(21) Appl. No.: 10/626,683

(22) Filed: Jul. 24, 2003

(65) Prior Publication Data

US 2004/0133508 A1    Jul. 8, 2004

Related U.S. Application Data

(63) Continuation-in-part of application No. 10/074,584, filed on Feb. 12, 2002, now abandoned, and a continuation-in-part of application No. 10/021,124, filed on Oct. 30, 2001, now abandoned, which is a continuation-in-part of application No. 09/812,627, filed on Mar. 20, 2001.

(60) Provisional application No. 60/398,095, filed on Jul. 24, 2002.

(51) Int. Cl.
 *G06Q 40/00* (2006.01)
(52) U.S. Cl. .......................................... 705/38; 705/35
(58) Field of Classification Search .................... 705/35, 705/38, 40; 708/100, 105, 110; 434/72, 434/107, 219

See application file for complete search history.

(56) References Cited

U.S. PATENT DOCUMENTS

| | | | |
|---|---|---|---|
| 4,326,259 | A | 4/1982 | Cooper et al. |
| 4,346,442 | A | 8/1982 | Musmanno |
| 4,376,978 | A | 3/1983 | Musmanno |
| 4,386,233 | A | 5/1983 | Smid et al. |
| 4,597,046 | A | 6/1986 | Musmanno et al. |
| 4,718,009 | A | 1/1988 | Cuervo |
| 4,727,243 | A | 2/1988 | Savar |
| 4,734,564 | A | 3/1988 | Boston et al. |
| 4,736,294 | A | 4/1988 | Gill et al. |

(Continued)

FOREIGN PATENT DOCUMENTS

CA    2441211    8/2003

(Continued)

OTHER PUBLICATIONS

Marc Schniederjans, Strategic Acquisition Management: A Multi-Objective Synergistic Approach, The Journal of the Operational Research Society, vol. 40, No. 4 Apr. 1989 (pp. 333-345).*

(Continued)

*Primary Examiner* — Mary Cheung
(74) *Attorney, Agent, or Firm* — Chadbourne & Parke LLP; John A. Squires

(57) ABSTRACT

Systems, methods, apparatus, computer program code and means for gathering, organizing and presenting on a real time basis information pertinent to Risks associated with subjects related to the Gaming Industry. Risks associated with the Gaming Industry can be managed by gathering data relevant to the Gaming Industry from multiple sources and aggregating the gathered data according to one or more risk variables. An inquiry relating to a risk subject can be received and portions of the aggregated data can be associated with the risk subject. The associated portions of the aggregated data can be transmitted to an entity placing the inquiry or other designated destination.

32 Claims, 6 Drawing Sheets

U.S. PATENT DOCUMENTS

| | | | |
|---|---|---|---|
| 4,774,663 A | 9/1988 | Musmanno et al. | |
| 4,774,664 A | 9/1988 | Campbell et al. | |
| 4,812,628 A | 3/1989 | Boston et al. | |
| 4,868,866 A | 9/1989 | Williams, Jr. | |
| 4,914,587 A | 4/1990 | Clouse | |
| 4,953,085 A | 8/1990 | Atkins | |
| 4,989,141 A | 1/1991 | Lyons et al. | |
| 5,025,138 A | 6/1991 | Cuervo | |
| 5,038,284 A | 8/1991 | Kramer | |
| 5,068,888 A | 11/1991 | Scherk et al. | |
| 5,161,103 A | 11/1992 | Kosaka et al. | |
| 5,177,342 A | 1/1993 | Adams | |
| 5,210,687 A | 5/1993 | Wolfberg et al. | |
| 5,239,462 A | 8/1993 | Jones et al. | |
| 5,274,547 A | 12/1993 | Zoffel et al. | |
| 5,323,315 A | 6/1994 | Highbloom | |
| 5,347,632 A | 9/1994 | Filepp et al. | |
| 5,398,300 A | 3/1995 | Levey | |
| 5,432,542 A | 7/1995 | Thibadeau et al. | |
| 5,444,819 A | 8/1995 | Negishi | |
| 5,446,885 A | 8/1995 | Moore et al. | |
| 5,448,047 A | 9/1995 | Nair et al. | |
| 5,453,601 A | 9/1995 | Rosen | |
| 5,455,407 A | 10/1995 | Rosen | |
| 5,457,305 A | 10/1995 | Akel et al. | |
| 5,557,518 A | 9/1996 | Rosen | |
| 5,565,909 A | 10/1996 | Thibadeau et al. | |
| 5,627,886 A | 5/1997 | Bowman | |
| 5,648,900 A | 7/1997 | Bowen et al. | |
| 5,649,116 A | 7/1997 | McCoy et al. | |
| 5,671,279 A | 9/1997 | Elgamal | |
| 5,679,938 A | 10/1997 | Templeton et al. | |
| 5,679,940 A | 10/1997 | Templeton et al. | |
| 5,680,305 A | 10/1997 | Apgar, IV | |
| 5,689,652 A | 11/1997 | Lupien | |
| 5,696,907 A | 12/1997 | Tom | |
| 5,704,045 A | 12/1997 | King et al. | |
| 5,717,923 A | 2/1998 | Dedrick | |
| 5,732,397 A | 3/1998 | DeTore et al. | |
| 5,732,400 A | 3/1998 | Mandler et al. | |
| 5,787,402 A | 7/1998 | Potter et al. | |
| 5,790,639 A | 8/1998 | Ranalli et al. | |
| 5,797,133 A | 8/1998 | Jones et al. | |
| 5,799,087 A | 8/1998 | Rosen | |
| 5,809,478 A * | 9/1998 | Greco et al. | 705/4 |
| 5,819,226 A | 10/1998 | Gopinathan et al. | |
| 5,819,236 A | 10/1998 | Josephson | |
| 5,852,812 A | 12/1998 | Reeder | |
| 5,875,431 A | 2/1999 | Heckman et al. | |
| 5,878,400 A | 3/1999 | Carter, III | |
| 5,884,289 A | 3/1999 | Anderson et al. | |
| 5,898,154 A | 4/1999 | Rosen | |
| 5,903,882 A | 5/1999 | Asay et al. | |
| 5,920,629 A | 7/1999 | Rosen | |
| 5,930,762 A * | 7/1999 | Masch | 705/7 |
| 5,933,816 A | 8/1999 | Zeanah et al. | |
| 5,940,812 A * | 8/1999 | Tengel et al. | 705/38 |
| 5,940,843 A | 8/1999 | Zucknovich et al. | |
| 5,953,423 A | 9/1999 | Rosen | |
| 5,963,648 A | 10/1999 | Rosen | |
| 5,963,923 A | 10/1999 | Garber | |
| 5,974,146 A | 10/1999 | Randle et al. | |
| 5,991,743 A | 11/1999 | Irving et al. | |
| 6,003,013 A | 12/1999 | Boushy et al. | |
| 6,014,228 A | 1/2000 | Castro | |
| 6,016,963 A | 1/2000 | Ezawa et al. | |
| 6,018,715 A | 1/2000 | Lynch et al. | |
| 6,018,723 A | 1/2000 | Siegel et al. | |
| 6,021,397 A | 2/2000 | Jones et al. | |
| 6,047,887 A | 4/2000 | Rosen | |
| 6,078,904 A | 6/2000 | Rebane | |
| 6,078,905 A | 6/2000 | Pich-LeWinter | |
| 6,085,175 A | 7/2000 | Gugel et al. | |
| 6,088,686 A | 7/2000 | Walker et al. | |
| 6,105,007 A | 8/2000 | Norris | |
| 6,105,010 A | 8/2000 | Musgrave | |
| 6,119,103 A | 9/2000 | Basch | |
| 6,148,297 A | 11/2000 | Swor et al. | |
| 6,148,301 A | 11/2000 | Rosenthal | |
| 6,199,073 B1 | 3/2001 | Peairs et al. | |
| 6,205,433 B1 | 3/2001 | Boesch et al. | |
| 6,219,805 B1 | 4/2001 | Jones et al. | |
| 6,236,972 B1 | 5/2001 | Shkedy | |
| 6,246,996 B1 | 6/2001 | Stein | |
| 6,249,770 B1 | 6/2001 | Erwin et al. | |
| 6,278,983 B1 | 8/2001 | Ball | |
| 6,289,320 B1 | 9/2001 | Drummond et al. | |
| 6,304,915 B1 | 10/2001 | Nguyen et al. | |
| 6,304,973 B1 | 10/2001 | Williams | |
| 6,311,272 B1 | 10/2001 | Gressel | |
| 6,317,727 B1 | 11/2001 | May | |
| 6,321,212 B1 | 11/2001 | Lange | |
| 6,330,546 B1 | 12/2001 | Gopinathan et al. | |
| 6,341,267 B1 | 1/2002 | Taub | |
| 6,347,307 B1 | 2/2002 | Sandhu et al. | |
| 6,393,423 B1 | 5/2002 | Goedken | |
| 6,415,271 B1 | 7/2002 | Turk et al. | |
| 6,456,984 B1 | 9/2002 | Demoff et al. | |
| 6,513,020 B1 | 1/2003 | Weiss et al. | |
| 6,516,056 B1 | 2/2003 | Justice et al. | |
| 6,542,905 B1 | 4/2003 | Fogel et al. | |
| 6,542,993 B1 | 4/2003 | Erfani | |
| 6,598,028 B1 | 7/2003 | Sullivan et al. | |
| 6,609,114 B1 | 8/2003 | Gressel et al. | |
| 6,609,658 B1 | 8/2003 | Sehr | |
| 6,658,393 B1 | 12/2003 | Basch et al. | |
| 6,658,400 B2 | 12/2003 | Perell et al. | |
| 6,671,818 B1 | 12/2003 | Mikurak | |
| 6,684,190 B1 | 1/2004 | Powers et al. | |
| 6,714,918 B2 | 3/2004 | Hillmer et al. | |
| 6,738,760 B1 | 5/2004 | Krachman | |
| 6,751,607 B2 | 6/2004 | Kraay et al. | |
| 6,757,898 B1 | 6/2004 | Ilsen et al. | |
| 6,785,661 B1 | 8/2004 | Mandler et al. | |
| 6,842,737 B1 | 1/2005 | Stiles et al. | |
| 6,868,408 B1 | 3/2005 | Rosen | |
| 6,898,574 B1 | 5/2005 | Regan | |
| 6,910,628 B1 | 6/2005 | Sehr | |
| 6,915,265 B1 | 7/2005 | Johnson | |
| 6,915,271 B1 | 7/2005 | Meyer et al. | |
| 6,947,908 B1 | 9/2005 | Slater | |
| 6,965,831 B2 | 11/2005 | Domany et al. | |
| 6,971,026 B1 | 11/2005 | Fujiyama et al. | |
| 6,983,266 B1 | 1/2006 | Goldschmidt | |
| 6,985,886 B1 | 1/2006 | Broadbent et al. | |
| 7,003,661 B2 | 2/2006 | Beattie et al. | |
| 7,006,992 B1 * | 2/2006 | Packwood | 705/38 |
| 7,024,383 B1 | 4/2006 | Mancini et al. | |
| 7,069,234 B1 | 6/2006 | Cornelius et al. | |
| 7,089,208 B1 | 8/2006 | Levchin et al. | |
| 7,114,177 B2 | 9/2006 | Rosenberg et al. | |
| 7,120,929 B2 | 10/2006 | Beattie et al. | |
| 7,124,101 B1 | 10/2006 | Mikurak | |
| 7,133,846 B1 | 11/2006 | Ginter et al. | |
| 7,161,465 B2 | 1/2007 | Wood et al. | |
| 7,167,844 B1 | 1/2007 | Leong et al. | |
| 7,181,428 B2 | 2/2007 | Lawrence | |
| 7,209,889 B1 | 4/2007 | Whitfield | |
| 7,231,327 B1 * | 6/2007 | Beverina et al. | 703/2 |
| 7,231,353 B1 | 6/2007 | Goyal | |
| 7,231,395 B2 | 6/2007 | Fain et al. | |
| 7,389,265 B2 | 6/2008 | Lawrence et al. | |
| 7,403,922 B1 | 7/2008 | Lewis et al. | |
| 7,415,607 B2 | 8/2008 | Sinn | |
| 7,426,489 B2 | 9/2008 | van Soestbergen et al. | |
| 7,426,492 B1 | 9/2008 | Bishop et al. | |
| 7,428,756 B2 | 9/2008 | Wookey | |
| 7,437,310 B1 | 10/2008 | Dutta | |
| 7,451,114 B1 | 11/2008 | Matsuda et al. | |
| 7,461,250 B1 | 12/2008 | Duane et al. | |
| 7,506,158 B2 | 3/2009 | Fox et al. | |
| 7,523,054 B2 | 4/2009 | Tyson-Quah | |
| 7,552,466 B2 | 6/2009 | Rosenberg et al. | |
| 7,562,212 B2 | 7/2009 | Beattie et al. | |
| 7,593,892 B2 | 9/2009 | Balk et al. | |
| 7,620,556 B1 | 11/2009 | Ross | |
| 7,650,496 B2 | 1/2010 | Thornton et al. | |

| | | |
|---|---|---|
| 7,653,810 B2 | 1/2010 | Thornton et al. |
| 7,657,482 B1 | 2/2010 | Shirey et al. |
| 7,694,135 B2 | 4/2010 | Rowan et al. |
| 7,698,549 B2 | 4/2010 | Thornton et al. |
| 7,698,557 B2 | 4/2010 | Saarepera et al. |
| 7,708,200 B2 | 5/2010 | Helsper et al. |
| 7,711,950 B2 | 5/2010 | Orbke et al. |
| 7,752,154 B2 | 7/2010 | Friedlander et al. |
| 7,813,944 B1 | 10/2010 | Luk et al. |
| 7,904,361 B2 | 3/2011 | Lawrence |
| 7,930,228 B1 | 4/2011 | Hawkins et al. |
| 2001/0001014 A1 | 5/2001 | Akins et al. |
| 2001/0011243 A1 | 8/2001 | Dembo et al. |
| 2001/0016833 A1 | 8/2001 | Everling et al. |
| 2001/0018674 A1 | 8/2001 | Schein et al. |
| 2001/0027388 A1 | 10/2001 | Beverina et al. |
| 2001/0027389 A1 | 10/2001 | Beverina et al. |
| 2001/0029493 A1 | 10/2001 | Pare et al. |
| 2001/0037275 A1 | 11/2001 | Johnson et al. |
| 2001/0037318 A1 | 11/2001 | Lindskog et al. |
| 2001/0044768 A1 | 11/2001 | Wares |
| 2001/0047279 A1 | 11/2001 | Gargone |
| 2001/0047347 A1 | 11/2001 | Perell et al. |
| 2001/0049651 A1 | 12/2001 | Selleck |
| 2001/0049793 A1 | 12/2001 | Sugimoto |
| 2001/0054020 A1 | 12/2001 | Barth et al. |
| 2001/0056359 A1 | 12/2001 | Abreu |
| 2002/0016854 A1 | 2/2002 | Hirasawa et al. |
| 2002/0019804 A1 | 2/2002 | Sutton |
| 2002/0029249 A1 | 3/2002 | Campbell et al. |
| 2002/0032626 A1 | 3/2002 | DeWolf et al. |
| 2002/0032635 A1 | 3/2002 | Harris et al. |
| 2002/0032646 A1 | 3/2002 | Sweeney et al. |
| 2002/0032665 A1 | 3/2002 | Creighton et al. |
| 2002/0035520 A1 | 3/2002 | Weiss |
| 2002/0035543 A1 | 3/2002 | Shedd et al. |
| 2002/0035685 A1 | 3/2002 | Ono et al. |
| 2002/0046053 A1 | 4/2002 | Hare et al. |
| 2002/0059093 A1 | 5/2002 | Barton et al. |
| 2002/0062438 A1 | 5/2002 | Asay et al. |
| 2002/0069084 A1 | 6/2002 | Donovan |
| 2002/0087454 A1 | 7/2002 | Calo et al. |
| 2002/0087455 A1 | 7/2002 | Tsagarakis et al. |
| 2002/0091622 A1 | 7/2002 | Mastwyk et al. |
| 2002/0091635 A1 | 7/2002 | Dilip et al. |
| 2002/0091706 A1 | 7/2002 | Anderson et al. |
| 2002/0099640 A1 | 7/2002 | Lange |
| 2002/0099649 A1 | 7/2002 | Lee et al. |
| 2002/0099651 A1 | 7/2002 | May |
| 2002/0103744 A1 | 8/2002 | Llewelyn |
| 2002/0103747 A1 | 8/2002 | Lawrence |
| 2002/0103852 A1 | 8/2002 | Pushka |
| 2002/0107767 A1 | 8/2002 | McClair et al. |
| 2002/0111890 A1 | 8/2002 | Sloan et al. |
| 2002/0120477 A1 | 8/2002 | Jinnett |
| 2002/0120582 A1 | 8/2002 | Elston et al. |
| 2002/0128939 A1 | 9/2002 | Tarrant |
| 2002/0128945 A1 | 9/2002 | Moss et al. |
| 2002/0128952 A1 | 9/2002 | Melkomian et al. |
| 2002/0128964 A1 | 9/2002 | Baker et al. |
| 2002/0129255 A1 | 9/2002 | Tsuchiyama et al. |
| 2002/0133442 A1 | 9/2002 | Laycock |
| 2002/0138371 A1 | 9/2002 | Lawrence et al. |
| 2002/0138407 A1 | 9/2002 | Lawrence et al. |
| 2002/0138408 A1 | 9/2002 | Lawrence |
| 2002/0138417 A1 | 9/2002 | Lawrence |
| 2002/0139837 A1 | 10/2002 | Spitz et al. |
| 2002/0143562 A1 | 10/2002 | Lawrence |
| 2002/0143693 A1 | 10/2002 | Soestbergen et al. |
| 2002/0152156 A1 | 10/2002 | Tyson-Quah |
| 2002/0161707 A1 | 10/2002 | Cole et al. |
| 2002/0184068 A1 | 12/2002 | Krishnan et al. |
| 2002/0188861 A1 | 12/2002 | Townsend |
| 2002/0194014 A1 | 12/2002 | Starnes et al. |
| 2002/0198827 A1 | 12/2002 | van Leeuwen |
| 2003/0009418 A1 | 1/2003 | Green et al. |
| 2003/0018483 A1 | 1/2003 | Pickover et al. |
| 2003/0018522 A1 | 1/2003 | Denimarck et al. |
| 2003/0023543 A1 | 1/2003 | Gunewardena et al. |
| 2003/0050718 A1 | 3/2003 | Tracy et al. |
| 2003/0065613 A1 | 4/2003 | Smith |
| 2003/0065942 A1 | 4/2003 | Lineman et al. |
| 2003/0066872 A1 | 4/2003 | McClure et al. |
| 2003/0069742 A1 | 4/2003 | Lawrence |
| 2003/0069821 A1 | 4/2003 | Williams |
| 2003/0069894 A1 | 4/2003 | Cotter et al. |
| 2003/0074272 A1 | 4/2003 | Knegendorf et al. |
| 2003/0074310 A1 | 4/2003 | Grovit et al. |
| 2003/0138407 A1 | 7/2003 | Lu et al. |
| 2003/0145124 A1 | 7/2003 | Guyan et al. |
| 2003/0163398 A1 | 8/2003 | Yoshioka et al. |
| 2003/0167177 A1 | 9/2003 | Branch |
| 2003/0167237 A1 | 9/2003 | Degen et al. |
| 2003/0172017 A1 | 9/2003 | Feingold et al. |
| 2003/0177087 A1 | 9/2003 | Lawrence |
| 2003/0187790 A1 | 10/2003 | Swift et al. |
| 2003/0195843 A1 | 10/2003 | Matsuda et al. |
| 2003/0233297 A1 | 12/2003 | Campbell |
| 2004/0024693 A1 | 2/2004 | Lawrence |
| 2004/0039704 A1 | 2/2004 | Gilliam et al. |
| 2004/0054563 A1 | 3/2004 | Douglas |
| 2004/0111379 A1 | 6/2004 | Hicks et al. |
| 2004/0193532 A1 | 9/2004 | Lawrence |
| 2004/0215557 A1 | 10/2004 | Michelsen |
| 2005/0080716 A1 | 4/2005 | Belyi et al. |
| 2005/0086090 A1 | 4/2005 | Abrahams et al. |
| 2005/0144114 A1 | 6/2005 | Ruggieri et al. |
| 2005/0187841 A1 | 8/2005 | Grear et al. |
| 2006/0010063 A1 | 1/2006 | Drummond et al. |
| 2006/0089894 A1 | 4/2006 | Balk et al. |
| 2006/0116898 A1 | 6/2006 | Peterson |
| 2006/0218651 A1 | 9/2006 | Ginter et al. |
| 2007/0005496 A1 | 1/2007 | Cataline et al. |
| 2007/0038544 A1 | 2/2007 | Snow et al. |
| 2007/0061594 A1 | 3/2007 | Ginter et al. |
| 2007/0219882 A1 | 9/2007 | May |
| 2007/0288355 A1 | 12/2007 | Roland et al. |
| 2008/0021835 A1 | 1/2008 | Ginter et al. |
| 2008/0077530 A1 | 3/2008 | Banas et al. |
| 2008/0319922 A1 | 12/2008 | Lawrence et al. |
| 2008/0320092 A1 | 12/2008 | Campbell et al. |
| 2009/0031127 A1 | 1/2009 | Campbell et al. |
| 2009/0043687 A1 | 2/2009 | van Soestbergen et al. |
| 2009/0132813 A1 | 5/2009 | Schibuk |
| 2009/0187761 A1 | 7/2009 | Campbell et al. |
| 2009/0299896 A1 | 12/2009 | Zhang et al. |
| 2009/0319420 A1 | 12/2009 | Sanchez et al. |
| 2010/0138262 A1 | 6/2010 | Lawrence |
| 2010/0235300 A1 | 9/2010 | Feingold |

FOREIGN PATENT DOCUMENTS

| | | |
|---|---|---|
| EP | 099489 | 5/2000 |
| EP | 1 137 209 A2 | 9/2001 |
| EP | 1 143 365 A2 | 10/2001 |
| JP | 02000020618 | 6/1998 |
| JP | 02000020618 A | 1/2000 |
| JP | 02003050896 | 8/2001 |
| JP | 02003050896 A | 2/2003 |
| WO | WO 00/75836 | 12/2000 |
| WO | WO 01/55885 | 8/2001 |
| WO | WO02075485 | 8/2002 |

OTHER PUBLICATIONS

Retailing: Casino, Cora Create Joint Buying Venture, The Wall Street Journal, Apr. 20, 1999, p. 1.*

Toshio Airtake, Japanese Government Panel recommends new laws to protect personal information, BNA's Banking Report, Dec. 6, 1999, p. 1.*

Regulatory Risks, Detroit News, Sep. 20, 1999, 2 pages.*

Carreker-Antinori Forms Risk Management Unit: New Service Helps Banks Identify, Reduce Operations Risk, Nov. 17, 1997, http://www.carreker.com/main/media/press_releases/releases1997/11-17-97.htm, 2 pages.*

Axciom®, PerformanceData to Link List Databases; AGreement Provides Credit Data, Real Property/Demographic Data, PR Newswire, Jul. 27, 1999, 3 pages.*

Tony Batt, Indians protest proposed changes in gaming regulations, Las Vegas Review Apr. 27, 1994, 1 page.*
Ralph Vartabedian, US Mounts High-Stakes Computer Reform Effort; Technology: The aim is to reverse decades of failing performance. Experts are encouraged at changes' breadth. Series: Fedearl Computers: Is System Haywire? Last of Three Parts, Los Angeles Times Dec. 10, 1996, 2 pages.*
Casino Gambling in New Jersey—A Report to the National Gambling Impact Study Commission, New Jersey Casino Control Commission, Jan. 1998 (57 pages).*
George Weir, Can Fiduciaries Avoid Liability Under Environmental Law?, Estate Planning, Jul./Aug. 1992, vol. 19, pp. 1-2.*
Dave Berns's article, Resort Owners Seek Loans, Los Vegas Review Journal, Nov. 16, 1999, p. 1.D.*
Capitol Briefs, Arizona Daily Star, Feb. 5, 1997, p. 3.B.*
FTC Settles with Debt Collection Agency, Credit Risk Management Reporter, Sep. 5, 2000, vol. 10, Iss 17, p. 1.*
"PCT Notification of Transmittal of the International Search Report", mailed Jul. 6, 2005, for PCT/US04/03766.
"Commentary: Foreign Assets Control Regulations: The Countries Aren't Enough", Letter of Credit Update, Mar. 1996, pp. 23-27.
"OFAC Compliance: A Perspective for Community Banks", ABA Bank Compliance Nov./Dec. 1998, pp. 39-48.
"Specially designated Who? A Primer on OFAC: Compliance" ABA Bank Compliance Mar./Apr. 1996, pp. 29-36.
Anonymous. "Information available at the web site of insuremarket". Feb. 20, 1999. 6 pages.
Anonymous. InsureZone's AgentSecure Expands by Adding Life and Disability Insurance to its Existing Commercial P&C Product Set. PR Newswire. No. 11920919. May 13, 2002, p. 1.
Anthony Mills article "A systematic approach to risk management for construction", Structural Survey, vol. 19, No. 5, p. 245, 2001.
Business Editors, Tarrant Apparel Group Announces Exercise of LDA Option Limit Now Holds 7.3% Interest in Tarrant, Oct. 22, 1998, Business Wire, p. 1-3.
Cetron, Martin; Keystone, Jay; Shlim, David; Steffen, Robert. "Travelers' Health". Jul.-Sep. 1998. Emerging Infectious Diseases. vol. 4, Issue 3.
Dirty Dollars Elude Authorities; Geiger, Keri, LatinFinance. Issue 140, found on http://proquest.umi.com , p. 1-3.
EPA Asbestos Ban: Clarification May 18, 1999, retrieved from http://www.epa.gov/asbestos/pubs/asbbans2.pdf, May 29, 2008.
EPA Asbestos Ban: Clarification May 18, 1999, retrieved from http://lxww.epa.Fov/asbestos/nubsiasbbans2.pdf, May 29, 2008.
Gramm-Leach-Bliley Act enacted Nov. 12, 1999 Exceptions to Notice and Opt-Out Requirements: Section 313.15.
International Health Regulations 1983. World Health Organization. Third Annotated Edition.
International Preliminary Examination Report dated Jun. 15, 2004 for PCT/US02/39260.
hiternational Preliminary Examination Report dated Mar. 16, 2005 for PCT/US03/17935.
International Preliminary Examination Report dated Oct. 9, 2002 for PCT/US02/07110.
International Preliminary Examination Report dated Sep. 29, 2003 for PCT/US03/23033.
International Preliminary Examination Report from PCT/US03/19242 dated Mar. 31, 2005.
International Search Report dated Feb. 3, 2003 for PCT/US02/07110.
International Search Report dated Jun. 19, 2003 for PCT/US03/07337.
International Search Report dated Jun. 24, 2004 for PCT/US03/018273.
International Search Report dated Jun. 2, 2003 for PCT/ US03/03993.
International Search Report dated May 30, 2003 for PCT/US02/24123.
International Search Report dated Oct. 7, 2003 for PCT/US03/17935.
International Search Report from PCT/US02/39260 dated Sep. 9, 2003.
International Search Report from PCT/US03/13169 dated Dec. 2, 2003.
International Search Report from PCT/US03/18273 dated Jun. 24, 2004.
International Search Report from PCT/US03/18430 dated Dec. 22, 2003.
International Search Report from PCT/US03/19198 dated Dec. 23, 2003.
International Search Report from PCT/US03/19219 dated Dec. 15, 2003.
International Search Report from PCT/US03/19242 dated Dec. 3, 2003.
International Search Report from PCT/US03/19376 dated Dec. 4, 2003.
International Search Report from PCT/US03/23033 dated Apr. 9, 2004.
International Search Report from PCT/US03/23310 dated Jun. 18, 2004.
Preparation Guidelines for Suspicious Activity Report Form (SAR), found on www.archive.org of Jun. 3, 2000.
Proprietary Right, Collins Dictionary of Law. London, WJ Stewart 2006.
Richard N. Clarke's article SICs as a Definition of Economic Markets, published in The Journal of Business, vol. 62, No. 1, Jan. 1989, p. 17-31.
SAR PC Software User Guide of the Internal Revenue Service, found on www.archive.org of Jun. 3, 2000 (p. i -61).
Sinkey,J.F. Commercial Bank Financial Management In the financial Services Industry 4th Edition McMillian Publishing Co New York, 1992 p. 156.
The Federal Trade Commission's article Fair Credit Reporting, Mar. 1999, retrieved from http://www.pueblo.gsa.govicic.sub.—text/money/fair-creditgair-crd.htm, May 29, 2008.
U.S. General Services Administration. 41 Code of Federal Regulations, Chapters 300-304. Jul. 1, 1997 Edition. pp. 10-18 retrieved from <http://www.gsa.gov/federaltravelregulation >.
Written Opinion dated Oct. 7, 2003 for PCT/US03/03993.
Written Opinion from PCT/US03/19198 dated Jul. 6, 2004.
Written Opinion from PCT/US03/19242 dated Jun. 21, 2004.
"PCT Notification of Transmittal of the International Search Report", mailed Jul. 6, 2005, for PCT/US04/03766.
"Firms Consider Pact to Track Terror Money." Wall Street Journal, Nov. 26, 2001.
"Five Ways to Reduce Risk with Neutral Networks." *Credit Risk Management Report*, vol. 3, Jun. 27, 1993.
"Enterprise Anti-Money Laundering Product Specification." *Mantas*, 2001.
"Transforming Discovery Into Opportunity"; "Key Personnel Bios"; "Frequently Asked Questions"; *Mantas*. Mantas, Inc., Announces Funding and Management Team:, *Mantas*, Jun. 4, 2001. "Safeguard and SRA Partner to Launch Mantas, Inc.", *Mantas,*. "Knowledge Discovery Platform"; "Money Laundering Detection for Banks"; "Fraud and Money Laundering Detection for Securities Firms"; "Best Execution"; "Equities Trading Compliance", *Mantas*.
Aguais, Scott D. "It's the Economy." *Credit Card Management*, vol. 5, 1993, pp. 58-60.
Banasiak, Michael, "Don't be Out-Scored by Your Competition", *Credit and Financial Management Review*, 2nd Quarter 2000.
Barrett, Jennifer, "Banking on Software Solutions", *Newsweek Web*, Jun. 12, 2002.
Caudill, Maureen et al., "Naturally Intelligent Systems." *The Mit Press*, 1990.
Chandler, Gary "Credit Scoring; A Feasibility Study." *Executive*, 1985.
Everest-Hill, Deborah "Automating Risk Assessment." *The Internal Auditor*, vol. 56, Jun. 1999, pp. 23-25.
Grafton, David. "Analysing Customers With Behavioural Modelling." *Credit Control*, vol. 17,1996, pp. 27-31.
Gullo, Karen "Neutral Nets Versus Card Fraud; Chase's Software Learns to Detect Potential Crime." *The American Banker*, Feb. 2, 1990.
Healy, Thomas J. "The New Science of Borrower Behavior." *Factiva*, Feb. 1, 1998.

Hicks M., "What, me spam?" Good intentions alone aren't enough to avoid alienating customers, eWeek Sep. 3, 2001, retrieved from Dialog, Dialog No. 08984028, see abstract.

Higgins, Kevin T. "Retention by the Numbers." *Credit Card Management*, vol. S, 1993, pp. 52-S6.

Int'l Search Report dated Feb. 3, 2003 for PCT/US02/07110.

Int'l Search Report dated Oct. 1, 2003 for PCT/US03/03994.

Leonard, Kevin J. and William J. Banks. "Automating the Credit Decision Process." *Journal of Retail Banking*, vol. 16,1994, p. 39.

McLure, Leslie "Taking the Risk Out of Transactions." *Factiva*, Mar. 1, 1994.

Power, Stephen "Background Checks Await Fliers." *The Wall Street Journal*, Jun. 7, 2002.

Purcell, Lea "Roping in Risk." *Factiva*, May 1, 1994.

Quinn, Jane Bryant "Credit Card Issuers; Keeping a Closer Watch on How You Pay Bills." *Washington Post*, Apr. 25, 1988.

World-Check Search—Vladimir Gusinsky (Russia).

* cited by examiner

| Risk Variable 602 | Gaming Industry Company 604 | Publication 606 | Source Identification Number 608 |
|---|---|---|---|
| Organized Crime Link | ACES | Reference 10023 | S0010 |
| Political Corruption | INLD | Reference 10024 | S0966 |
| Money Laundering | BNGO | Reference 10025 | S10099 |
| Accounting Irregularities | WINS | Reference 10026 | S00455 |
| Regulatory | HPRK | Reference 10027 | S99077 |

GAMING INDUSTRY RISK MANAGEMENT CLEARINGHOUSE

RELATED APPLICATIONS

This application claims the benefit of the filing date of U.S. Provisional application No. 60/398,095 entitled "Gaming Industry Risk Management Clearinghouse", filed Jul. 24, 2002 now abandoned. This application is a continuation-in-part of a prior application entitled "Risk Management Clearinghouse" filed Feb. 12, 2002 now abandoned and bearing the Ser. No. 10/074,584, as well as being a continuation-in-part of a prior application entitled "Risk Management Clearinghouse" filed Oct. 30, 2001 now abandoned, and bearing the Ser. No. 10/021,124, which is also a continuation-in-part of a prior application entitled "Automated Global Risk Management" filed Mar. 20, 2001, and bearing the Ser. No. 09/812,627, all of which are relied upon and incorporated by reference.

FIELD

The present invention relates to systems, methods, apparatus, computer program code and means for facilitating the identification, investigation, assessment and management of legal, regulatory, financial and reputational risks ("Risks"). More particularly, embodiments of the present invention relate to systems, methods, apparatus, computer program code and means to conduct due diligence and research and make informed decisions to manage Risks relating to casinos; gambling games; the provision of gambling activities; gambling facilities; gambling facility operators; employees of a gambling facility operators; and providers of services outsourced from gambling facility operators and other gambling activities (Gaming Industry).

BACKGROUND

The Gaming Industry has grown increasingly important in terms of economic value and social concern during recent years. Generally, the U.S. Gaming Industry has revenues that may reach $60 billion annually and provides hundreds of thousands of jobs. However, the association of the Gaming Industry with social problems and crime is also widely recognized. Some estimates hold that there are more pages of government regulation related to gambling than there are for regulating the nuclear industry. In addition history indicates that gambling related political corruption become so prevalent in the 1800's that every state outlawed lotteries and other forms of gambling. Since gambling has again expanded numerous cases of political corruption have been exposed. Clearly, the Gaming Industry has both benefits and Risks.

Compliance officers and other financial institution personnel typically have few resources available to assist them with the identification of present or potential global risks associated with a particular entity or transaction involving the Gaming Industry. Risks can be multifaceted and far reaching. The amount of information that needs to be considered to evaluate whether involvement with a Gaming Industry entity poses a significant risk or should otherwise be restricted, is substantial.

However, institutions do not have available a mechanism which can provide real time assistance to assess one or more risk variables associated with the Gaming Industry, or otherwise qualitatively manage such risk. In the event of an investment problem, it is often difficult to quantify to regulatory bodies, shareholders, newspapers and/or other interested parties, the diligence exercised by the financial institution to properly identify and respond to risk factors. Absent a means to quantify good business practices and diligent efforts to contain risk, a financial institution may appear to be negligent in some respect.

General data services that are available to search news sources and other public information will accept a query and return a result. However, such services are not integrated into a risk management system. In addition, present data services only return a flat response to a query submitted without any further data mining or scrubbing. The inefficiency of having to manually ascertain what terms should be searched and then submit query that includes those terms makes these systems overbearing on a transaction by transaction basis. Also, over time, databases can accrue a wide range of inaccuracies and inconsistencies, such as misspelled names, inverted text, missing fields, alternate spelling of key phrases, and other blemishes. Fixing such faulty records by hand on a timeframe needed to perform risk management associated with a financial transaction may be impossible as well as expensive and could result in the introduction of even more errors. What is needed is a method and system to draw upon information gathered globally and utilize the information to assist with risk management and due diligence related to financial transactions. A new method and system should anticipate scrubbing data from multiple sources in order to facilitate merging data from all necessary sources. In addition, data mining should be made available to ascertain patterns or anomalies in the query results. Risk information should also be situated to be conveyed to a compliance department and be able to demonstrate to regulators that a financial institution has met standards relating to risk containment.

Currently there is no convenient way to facilitate a comprehensive analysis of a Gaming Industry related entity without strenuous research of multiple disparate sources. What is needed is a tool to facilitate analysis of Gaming Industry related subjects.

SUMMARY

Accordingly, to alleviate problems inherent in the prior art and facilitate analysis of Gaming Industry related subjects, embodiments of the present invention introduce systems, methods, apparatus, computer program code and means for gathering, organizing and presenting on a real time basis information pertinent to Risks associated with Gaming Industry related subjects. According to some embodiments, Risks associated with the Gaming Industry can be managed by gathering data relevant to the Gaming Industry from multiple sources and aggregating the gathered data according to one or more risk variables. An inquiry relating to a risk subject associated with the Gaming Industry can be received and portions of the aggregated data can be associated with the risk subject. The associated portions of the aggregated data can be transmitted to an entity placing the inquiry or other designated destination.

Systems, methods, apparatus, computer program code and means for managing Risks are also provided where an alert can be implemented to continually monitor data and transmit any updated data associated with the risk subject.

Systems, methods, apparatus, computer program code and means for managing Risks can be implemented by interacting with a network access device to access a risk management server. Interaction can be initiated via a communications network and information descriptive of a risk subject related to the Gaming Industry can be input and transmitted to a risk management clearinghouse server. The server can respond by transmitting data associated with risk variables that relate to the risk subject which can be received at the network access device.

With these and other advantages and features of the invention that will become hereinafter apparent, the invention may be more clearly understood by reference to the following detailed description of the invention, the appended claims, and the drawings attached herein.

DETAILED DESCRIPTION

Figure 1:
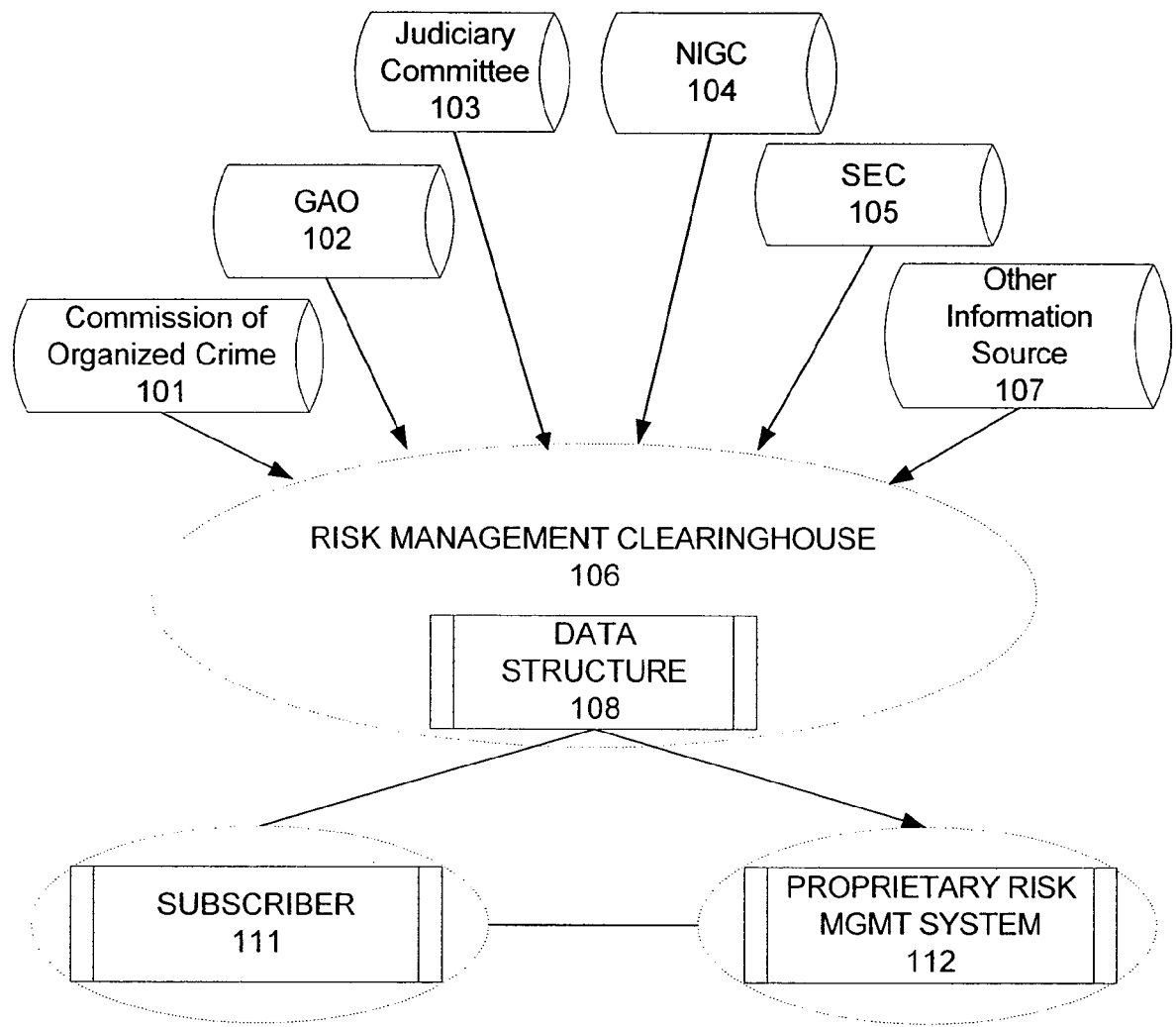
FIG. 1 illustrates a block diagram that can embody this invention.

The present invention includes computerized systems and methods for managing Risk associated with the Gaming Industry. A computerized system continuously gathers and stores information as data in a database or other data storing structure and processes the data in preparation for a Risk inquiry search relating to a Risk subject, such as a casino facility, a casino operator, a publicly traded gaming industry company, a casino or other gaming industry employee, or other gaming industry related subject. Document images and sources of information can also be stored. A Subscriber, such as an investor, a charity, a special interest group, a government entity, a financial institution, an insurance company, or other interested party, can submit a Risk management subject for which a Risk inquiry search can be performed. A Risk assessment or Risk inquiry search can be made against the gathered data and a comprehensive list of reference documents, related sources, reports and other data related to the Risk subject can be provided.

Definitions

To aid in the description of the present invention, the following definitions can apply to terms utilized throughout this document:

Financial Transaction: a Financial Transaction refers to any action that anticipates a transfer of money from a first set of one or more Transaction Participants to a second set of one or more Transaction Participants. Examples of Financial Transactions can include: investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

Gaming Industry: As pointed out in the Field of Invention, Gaming Industry refers to casinos; gambling games; the provision of gambling activities; gambling facilities; gambling facility operators; employees of a gambling facility operators; and providers of services outsourced from gambling facility operators and other gambling activities.

Informational Artifact: Informational Artifact refers to a media item that contains information that can be interpreted into a humanly ascertainable form. Examples of Informational Artifacts include: a news article, a news feed portion, a video segment, a newscast, a report, an identifiable document, an agency listing, a list, a government publication, other identifiable publication, a sound byte, a sound recording, or other media item.

Risk Bearing Institution: A Risk Bearing Institution refers to any person, entity, company, corporation or statutory "person" in the business of providing Financial transactions. As such a Risk Bearing Institution can include, for example: a securities broker, a retail bank, a commercial bank, investment and merchant bank, private equity firm, asset management company, a mutual fund company, a hedge fund firm, insurance company, a credit card issuer, retail or commercial financier, a securities exchange, a regulator, a money transfer agency, bourse, an institutional or individual investor, an auditing firm, a law firm, any institution the business of which is engaging in financial activities as described in section 4(k) of the Bank Holding Act of 1956 or other entity or institution who may be involved with a financial transaction or other business transaction or any entity subject to legal and regulatory compliance obligations with respect to money laundering, fraud, corruption, terrorism, organized crime, regulatory and suspicious activity reporting, sanctions, embargoes and other regulatory risks and associated obligations.

Risks: Risks associated with a financial transaction can include factors associated with security risk, financial risk, legal risk, regulatory risk and reputational risk. A Security Risk refers to breach of a safety measure that may result in unauthorized access to a facility; unauthorized access to data; physical harm, including threat of immediate risk of harm to a person or goods. Financial Risk refers to factors indicative of monetary costs that the Risk Bearing Institution or a Transaction Participant may be exposed to as a result of a particular Financial Transaction. Monetary costs can be related to fines, forfeitures, costs to defend an adverse position, lost revenue, or other related potential sources of expense. Regulatory Risk refers to factors that may cause the Risk Bearing Institution or Transaction Participant to be in violation of rules put forth by a government entity or regulatory agency, such as the Securities and Exchange Commission (SEC), a state Gaming Commission or Division of Gaming Enforcement, or other agency. Reputational risk relates to harm that a Risk Bearing Institution or Transaction Participant may suffer regarding its professional standing in an industry or the public eye. A Risk Bearing Institution and Transaction Participant can suffer from being associated with a situation that may be interpreted as contrary to an image of diligence, honesty and forthrightness.

Risks may be related to the duty to disclose material information, to report and possibly prevent: fraud, money laundering, foreign corrupt practices, bribery, embargoes and sanctions. Timely access to relevant data on which to base a regulatory or reputational Risk related action can be critical to conducting business and comply with regulatory requirements such as those set forth by the Patriot Act in the United States.

Risk Management Clearinghouse (RMC): RMC refers to computerized systems and methods for managing Risks and associating information and/or informational artifacts useful for quantifying Risk with a Risk subject, as more fully described in the related patent applications: Ser. No. 10/074,584 entitled "Risk Management Clearinghouse" filed Feb.

12, 2002, and U.S. patent application Ser. No. 10/021,124 entitled "Risk Management Clearinghouse" filed Oct. 30, 2001.

Risk Quotient: Risk Quotient refers to a quantitative value of an amount of Risk, a Risk Quotient can be based upon a weighted algorithm applied to the Risk criteria and informational artifacts.

Risk Variable: A Risk variable can be any data that can cause a Risk level to change. Risk variables may include, for example, factors involving the Gaming Industry and links to organized crime or political corruption.

Risk variables can also include, for exemplary purposes: financial information related to an Gaming Institution or facility; annual reports; government filings, personnel employed by the Gaming Institution or at a Gaming facility; stock price and/or history; corporate bonds issued, equity offerings; bankruptcy proceedings; litigations involving a Gaming Institution or Gaming facility; types of services available at a Gaming facility; demographics of a Gaming facility; business developments including mergers, acquisitions, expansion, additional services or other material developments; government or regulatory actions implemented concerning a Gaming facility or provider; history of fraud or maltreatment by a Gaming facility, provider or employee; felony history by a Gaming facility provider or employee; or other factors.

Subscriber: A Subscriber can include any legal "person" or entity, such as, for example: a consumer or consumer group, a government entity, a securities broker, a bank, a private equity firm, an asset management company, a mutual fund company, a hedge fund firm, a local community, a securities exchange, an institutional or individual investor, an auditing firm, a law firm, any institution which includes in its business, investment in, advice relating to, or involvement with the Gaming Industry facility or Gaming Industry provider.

Transaction Participant: Transaction Participant refers to a person who will partake in a Financial transaction.

Risk associated with the Gaming Industry can be greatly increased due to the difficulty in gathering and accessing pertinent data on a basis timely to managing risk associated with particular facts or documents. As part of due diligence associated with becoming associated with, or investing in, an entity in the Gaming Industry, it is important to ascertain a level of Risk generated by a situation. Such due diligence may be related, for example, to potential investment activity, public relations activity, business transactions, political or charitable donations or other activity.

The Risk assessment or inquiry search can include data retrieved as a result of augmented retrieval methods. Scrubbed data as well as augmented data can be transmitted from a Risk management clearinghouse (RMC) to a Subscriber or to a proprietary Risk system utilized by a Subscriber, such as a Risk management system maintained in-house. Risk inquiry searches can be automated and made a part of standard operating procedure for decision making processes and due diligence performed by the Subscriber.

Referring now to FIG. 1 a block diagram of some embodiments of the present invention is illustrated. An RMC system 106 gathers and receives information which may be related to Risk variables associated with the Gaming Industry. Information may be received, for example, from publicly available sources 101-105, Subscribers 111, investigation entities, or other sources 107. The information can be constantly updated and can be related to: a Gaming Industry facility; a Gaming Industry provider; an affiliation to a Gaming Industry provider, such as a parent corporation; or other Gaming Industry related subject or Gaming Industry related alert list in order to facilitate due diligence or other research efforts. The RMC system 106 facilitates due diligence on the part of a Subscriber 111 by gathering, structuring and providing to the Subscriber 111 data that relates to Risk variables involved in a designated Gaming Industry subject.

Information relating to a Risk variable can include any data that can cause a Risk level to change. Sources of Gaming Industry Risk variable information may include, for example: subjects addressed by federal statute or regulation such as in the U.S. Code or Federal Register; instances of political corruption; licenses to permit gambling; links to organized crime; money laundering activities; State statutes and regulations; actions by a State Gaming Commission; actions by a Federal Senate or House Committee, such as the House Judiciary Committee, the House Government Reform Committee, the Senate Governmental Affairs Committee, the Senate Select Indian Affairs Committee; General Accounting Office Actions; changes to the Internal Revenue Tax Code; actions by the U.S. Treasury; or other variables. Variables relating to international aspects of the Gaming Industry can also be included, such as: rules or actions put forth by the Australia New South Wales Casino Control Authority; the Victorian Casino and Gaming Authority; the Canada Ontario Casino Corporation; the New Zealand Casino Control Authority, the United Kingdom Gaming Board; the international Association of Gaming Regulators; or other source. Some embodiments can include associating a related reference, such as, a Federal or foreign statute, regulation or other reference with a portion of the gathered data.

Other Risk variable sources can include, for exemplary purposes: financial information related to a Gaming Industry company or facility; annual reports; government filings, personnel employed by the Gaming Industry or at a Gaming Industry facility; stock price and/or history; corporate bonds issued, equity offerings; bankruptcy proceedings; litigations involving a Gaming Industry entity or Gaming Industry facility; types of activities available at a Gaming Industry facility; demographics of clientele, employees, owners, or other interested people; Gaming Industry business developments such as, for example, mergers, acquisitions, expansion, additional services or other material developments; government or regulatory actions implemented concerning the Gaming Industry facility or provider; history of fraud or money laundering associated with a Gaming Industry facility, provider or employee; felony history associated with a Gaming Industry facility, provider or employee; or other factors.

Risk variable related information can also be received from formalized lists, such as, for example: a list generated by a consumer watchdog group, a list generated by a state or federal agency, publications by Gaming Industry advocates, opposition, watchdog groups by health care advocates, publications by organizations with interested constituents, such as the American Gaming Association (AGA), the Public Sector Gaming Study Commission (PSGSC), a list set forth by a State Gaming Commission; a list by State r Federal Attorney General's Office or other source of Risk variables.

Court records or other references relating to violation of regulatory statute, fraud, bankruptcy, professional reprimand or a rescission of a right to run a gambling activity, prison records or other source of suspect behavior can also be an important source of information.

It is also known in the Gaming Industry for former government employees with positions related to enforcement of government gambling regulations and policies to become employed by casino operators and other gaming participants. Such movement of place of employment can relate to Risks associated with ethical implications or provide some credibility to the efforts put forth by the Gaming Industry to hire credible employees with proper knowledge of pertinent issues. Accordingly, records or other artifacts, which can include public records or privately collected information, and which relates to prior employment of Casino or other Gaming Industry employees can be included in the information gathered that relates to Risk variables.

Gathered information can also include information indicative that an Gaming Industry entity does not present high Risk, such as participation on a major trading exchange, recommendation by a prominent insurer or advocacy group, or other endorsement.

In some embodiments, information can be received by the RMC 106 from a Subscriber 111. Information supplied by a Subscriber 111 can include data gathered according to a normal course of dealings with a particular Gaming Industry related entity. For example, a casino operator may supply information to the RMC 106 relating to its operations, or the SEC may receive information from the Gaming Industry which is subsequently received by the RMC 106.

A financial investment that involves an Gaming Industry facility or an Gaming Industry provider can include, for example: public and private financing; securities trading; commercial and consumer lending; asset management; rating of corporations and securities; public and private equity investment; public and private fixed income investment; listing of a company on a securities exchange, employee screening, auditing of corporate or other entity, legal opinions relating to a corporate or other entity, or other business related transactions.

A decision involving the Gaming Industry provider or facility can be dependent upon many factors. A multitude and diversity of Risks related to the factors may need to be identified and evaluated. In addition, the weight and implications of the factors and associated Risks can be interrelated. The present invention can provide a consistent and uniform method for a consumer, business, legal, compliance, credit and other related interest to identify and assess Risks associated with the Gaming Industry provider or facility. An RMC system 106 can allow Risks related to the Gaming Industry and investment activity involving the Gaming Industry to be identified, correlated and quantified by a Subscriber on a confidential or public basis and facilitate the assessment of legal, regulatory, financial and reputational exposure.

Similarly, the RMC system 106 can support a Subscriber's effort to meet requirements regarding the maintenance of accurate books and records relating to their financial transactions involving the Gaming Industry entity and affirmative duty to disclose material issues affecting an investor's decisions involving the Gaming Industry facility or provider.

Information gathered from the diversity of data sources can be aggregated into a searchable data storage structure 108. Some embodiments can include receiving and storing a source of information. In some instances a Subscriber 111 may wish to receive information regarding the source of information received, such as, for example, if a Subscriber wishes to pursue obtaining additional related information; ascertain the veracity of the information; check to see how current the information is; determine credibility of the source or other reason. Gathering data 108 into an aggregate data structure 108, such as a data warehouse can allow a RMC system 106 to have the data 108 readily available for processing a Risk management search associated with a Risk subject. Aggregated data 108 can also be scrubbed or otherwise enhanced.

In some embodiments including enhanced data, data scrubbing can be utilized to implement a data warehouse comprising the aggregate data structure 108. Data scrubbing can access information from multiple databases 108 and store it in a manner that gives more efficient more flexible access to key facts. Scrubbing can facilitate expedient access to accurate data commensurate with a critical decision that may be based upon a Risk management assessment provided.

Various data scrubbing routines can be utilized to facilitate aggregation of Risk variable related information. The routines can include programs capable of correcting a specific type of mistake, such as an incomprehensible address, or clean up a full spectrum of commonly found database flaws, such as field alignment that can pick up misplaced data and move it to a correct field, or removing inconsistencies and inaccuracies from like data. Other scrubbing routines can be directed directly towards specific Gaming Industry issues, such as auditing results, filed complaints or court records.

A scrubbing routine can be useful, for example, to facilitate coordination of related terms utilized in different jurisdictions, such as a State agency, commission or other entity responsible for oversight of gambling activities within their jurisdiction. A data scrubbing routine can be programmed to facilitate Risk variable searching for multiple spellings of an equivalent term, different terminology utilized for similar functions or other important information. Such a routine can enhance the value of the aggregate data gathered and also help correct database flaws. Scrubbing routines can improve and expand data quality more efficiently than manual mending and also allow a Subscriber 111 to quantify best practices for regulatory or other purposes.

Retrieving information related to Risk variables from the aggregated data 108 is an operation with the goal to fulfill a given a request. In order to process a request against a large document set of aggregated Risk data with a response time acceptable to the user, it may be necessary to utilize an index based approach to facilitate acceptable response times. A direct string comparison based search may be unsuitable for the task.

An index file for a collection of documents can therefore be built upon receipt of new data and prior to a query or other request. The index file can include a pointer to a document and also include important information contained in a document. During a query, the RMC system 106 can match the query against a representation of one or more documents, instead of the documents themselves. The RMC system 106 can retrieve any documents referenced by the indexes in order to satisfy a request submitted by a Subscriber 111. However, it may not be necessary to retrieve a full document as an index record may contain enough relevant information gleaned from the document it points to. Therefore, in some instances a Subscriber 111 may be able to obtain information of interest without having to read a related source document.

For example, at least two retrieval models can be utilized in fulfilling a search request: a) Boolean, in which the document set is partitioned in two disjoint parts: one fulfilling the query and one not fulfilling it, and b) relevance ranking based in which all the documents are considered relevant to a certain degree. Boolean logic models can use exact matching, while relevance ranking models typically utilize fuzzy logic, vector space techniques, neural networks, and probabilistic schema.

Augmenting data can include data mining techniques which utilize software to analyze and sift through aggregated data 108 using techniques such as mathematical modeling, statistical analysis, pattern recognition, rule based trends or other data analysis tools. In contrast to a system that may have gathered and stored information in a flat file and presented the stored information when requested, such as in a defined report related to a specific Risk subject or other ad hoc access concerned with a particular query at hand, the present invention can provide Risk related searching that adds a discovery dimension by returning results that a human operator may find labor and cognitively intense.

This discovery dimension supplied by the RMC system 106 can be accomplished through the execution of augmenting techniques, such as data mining, applied to the Risk related data that has been aggregated. Data mining can include the extraction of implicit, previously unknown and potentially useful information from the aggregated data. This type of extraction can include unlooked for correlations, patterns or trends. Other techniques that can be applied can include fuzzy logic and/or inductive reasoning tools.

Embodiments can include a Subscriber 111 accessing the RMC system 106 via a computerized system as discussed more fully below. The Subscriber 111 can input a description of a Risk subject, or other inquiry, such as, for example, the name of a party involved with the Gaming Industry facility. In some instances, and in accordance with applicable laws, identifying information relating to our individual can also be input, such as a date of birth, a place of birth, a social security number or other identifying number, or any other descriptive information. The RMC system 106 can receive any input information descriptive of the risk subject and perform a Risk related inquiry or search related to the risk subject on the scrubbed data.

Embodiments can also include utilization of a computerized proprietary Risk management (PRM) system 112. The PRM system 112 can receive an electronic feed from an RMC system 106 with updated raw data, scrubbed data or other data embodiment. In addition, data mining results can also be transmitted to the PRM system 112 or performed by the PRM system 112 for integration into the Risk management practices provided in-house by the Subscriber 111.

Information entered by a Subscriber 111 into a PRM system 112 may be information gathered according to a normal course of dealings with a particular entity or as a result of a concerted investigation. In addition, since the PRM system 112 is proprietary, and a Subscriber 111 responsible for the information contained therein can control access to the information contained therein, the PRM system 112 can include information that is public or proprietary.

In addition, some embodiments can include information entered into a PRM system 112 which can be shared with a RMC system 106. Informational data can be shared, for example via an electronic transmission or transfer of electronic media. However, RMC system 106 data may be subject to applicable local or national law and safeguards should be adhered to in order to avoid violation of such law through data sharing practices. In the event that a Subscriber 111, or other interested party, discovers or suspects that a person or entity is involved in a fraudulent or otherwise illegal activity, the system can also be utilized to generate a report containing related information which can be distributed to an appropriate authority.

A log or other stored history can be created by the RMC system 106 and/or a PRM system 112, such that utilization of the system can mitigate adverse effects relating to a problematic situation. Mitigation can be accomplished by demonstrating to an investor or other interested party that due diligence is being addressed through tangible Risk management processes.

Questions can also be presented to an inquiry initiator by a programmable robot via a GUI. Questions can relate to a particular Gaming Industry provider or a Gaming Industry facility, a particular type of client, a type of investment, or other criteria or subject.

A query may, for example, search for information relating to a Risk subject, such as an individual or circumstance associated with Gaming Industry and provide questions, historical data, world event information and other targeted information to facilitate a determination of Risk associated with a Risk subject. For example, a query regarding a Risk entity's financial position can be input and include reference to a Gaming Industry facility, a Gaming Industry provider, a parent organization, or other related detail. Measures can also be put in place to insure that all such inquiries should be subject to prevailing law and contractual obligations.

A query can include direct input into a RMC system 106, such as through a graphical user interface (GUI) with input areas or prompts. A query can also be automatically generated from monitoring transactions, investments, recommendations or other actions undertaken by a Subscriber 111. For example, an information system can electronically scan communication data for key words, entity names, treatment types or other pertinent data. Programmable software can be utilized to formulate a query according to names, treatment descriptions, investments or other pertinent data and run the query against a database 108 maintained by the RMC system 106. Other methods can include voice queries via a telephone or other voice line, such as voice over internet, fax, electronic messaging, or other means of communication.

Prompts or other questions proffered by the RMC system 106 can also depend from previous information received. Information generally received, or received in response to the questions, can be input into the RMC system 106 from which it can be utilized for real time Risk assessment.

Some embodiments can include generation of a Risk valuation, such as a Risk quotient, which is a rating or other value indicative of an amount of Risk associated with a Risk subject. If desired, a RMC server 210 or a PRM server 112 can also generate a suggested action to take responsive to a particular risk quotient.

Some embodiments can also include an alert list containing names and/or terms of interest to a Subscriber 111 which are supplied to a RMC system 106 by a Subscriber 111 or other source 107. An alert list can be customized and specific to a Subscriber 111. The RMC system 106 can continually or periodically monitor data in the RMC database 108 via an alert query with key word, fuzzy logic or other search algorithm and transmit related informational data to the interested party. In this manner, ongoing diligence can be conducted. In the event that new information is uncovered by the alert query, the Subscriber 111 can be immediately notified, or notified according to a predetermined schedule. Appropriate action can be taken according to the information uncovered.

In some embodiments, the RMC database can contain only information collected from publicly-available sources relevant to the provision or regulation of Gaming Industry or to Gaming Industry as an industry. A Subscriber 111 can use the RMC database 108 to identify indications of high risk activity included in artifacts presented by the RMC 106. High risk activities identified in the artifacts can include, for example: the possibility that a Gaming Industry facility or Gaming Industry provider is involved with inappropriate, illegal, politically volatile, socially adverse, immoral or other questionable activity. In addition, an RMC 106 can be useful in determining whether the Gaming Industry provider is fiscally viable.

A Subscriber 111 to the RMC system 106 can access the database 108 electronically and receive relevant information electronically or in hard copy format. A Subscriber 111 can be permitted to access information in the RMC system 106 in various ways, including, for example: system to system inquires involving single or batch screening requests, individual inquiries (submitted electronically, by facsimile, or by phone), or through a web-based interface supporting various query types.

In some embodiments, an RMC system 106 can take any necessary steps so as not to be regulated as a consumer reporting agency. Such steps may include not collecting or permitting others to use information from the RMC database 108 to establish an individual's eligibility for consumer credit or insurance, other business transactions, or for employment or other Fair Credit Reporting Act (FCRA) covered purposes such as eligibility for a government benefit or license.

To satisfy the requirements of such embodiments, a subscription agreement to an RMC system 106 can be established between the RMC system 106 provider and a Subscriber 111 which will create enforceable contractual provisions prohibiting the use of data from the RMC database 108 for such purposes. The operations of the RMC system 106 can be structured to minimize the Risk that the RMC database 108 will be used to furnish consumer reports and therefore become subject to the FCRA.

Some embodiments can also include additional policies and practices which are established to achieve the objective of not being subject to FCRA, such as, for example: the information in the RMC database 108 can be collected only from reputable, publicly available sources and not contain information from consumer reports; the RMC system 106 can forego collection of or permit others to use, information from the RMC database 108 to establish an individual's eligibility for consumer credit or insurance, other business transactions, or for employment or other FCRA-covered purposes. Subscribers 111 can be required to execute a licensing agreement that will limit their use of the data to specified purposes. A Subscriber 111 can be required to certify that the Subscriber 111 will use the data only for such specified purposes, and to certify annually that the Subscriber 111 remains in compliance with these principles.

A licensing agreement can also require that Subscribers 111 separately secure information from non-RMC system 106 sources to satisfy any need the Subscriber 111 has for information to be used in connection with the Subscriber's determination regarding a consumer's eligibility for credit, insurance, other business transactions, or employment or for other FCRA-covered purposes.

In some embodiments, a RMC system 106 can be structured to take advantage of the immunity from liability for libel and slander granted by the Communications Decency Act ("CDA") to providers of interactive computer services. Where its operations are not protected by the CDA, an RMC system 106 may be able to reduce its Risk of liability for defamation substantially by relying only on official sources and other reputable sources, and taking particular care with defamatory information from unofficial sources. In addition the RMC system 106 provider can take reasonable steps to assure itself of the information's accuracy, including insuring that the source of the information is reputable.

In some embodiments, a RMC system 106 can operate as an interactive computer service as that term is defined in the CDA. In such embodiments, the clearinghouse can provide an information service and/or access software that enables computer access by multiple users to a computer server. In some embodiments, if desired, an RMC system 106 provider can limit its employees or agents from creating or developing any of the content in the RMC database 108. Content be maintained unchanged except that the RMC system 106 can remove information from the RMC database 108 that it determines to be inaccurate or irrelevant.

Some embodiments can also include a value rating, such as a risk quotient which can be generated to readily indicate a level of risk associated with a particular risk subject. The risk quotient can be based upon a weighted algorithm applied to the risk variables or other factors. The risk quotient can be made available on a periodic basis, on demand in real time, in response to an event such as an inquiry a placement or an investment; or according to some other request. Actions commensurate with a risk level can be presented to assist with proper risk management.

If desired, embodiments can include a comparison of risk related data and risk quotients for disparate entities. The comparison can include data and sources of the data as well as a risk quotient value rating of an amount of risk that can be associated with each risk subject. Risk can be mitigated by the association of a risk subject with risk variables that contain less inherent risk, such as a public organization subject to reporting requirements, or a facility associated with the Gaming Industry provider that enjoys an excellent reputation.

Figure 2:
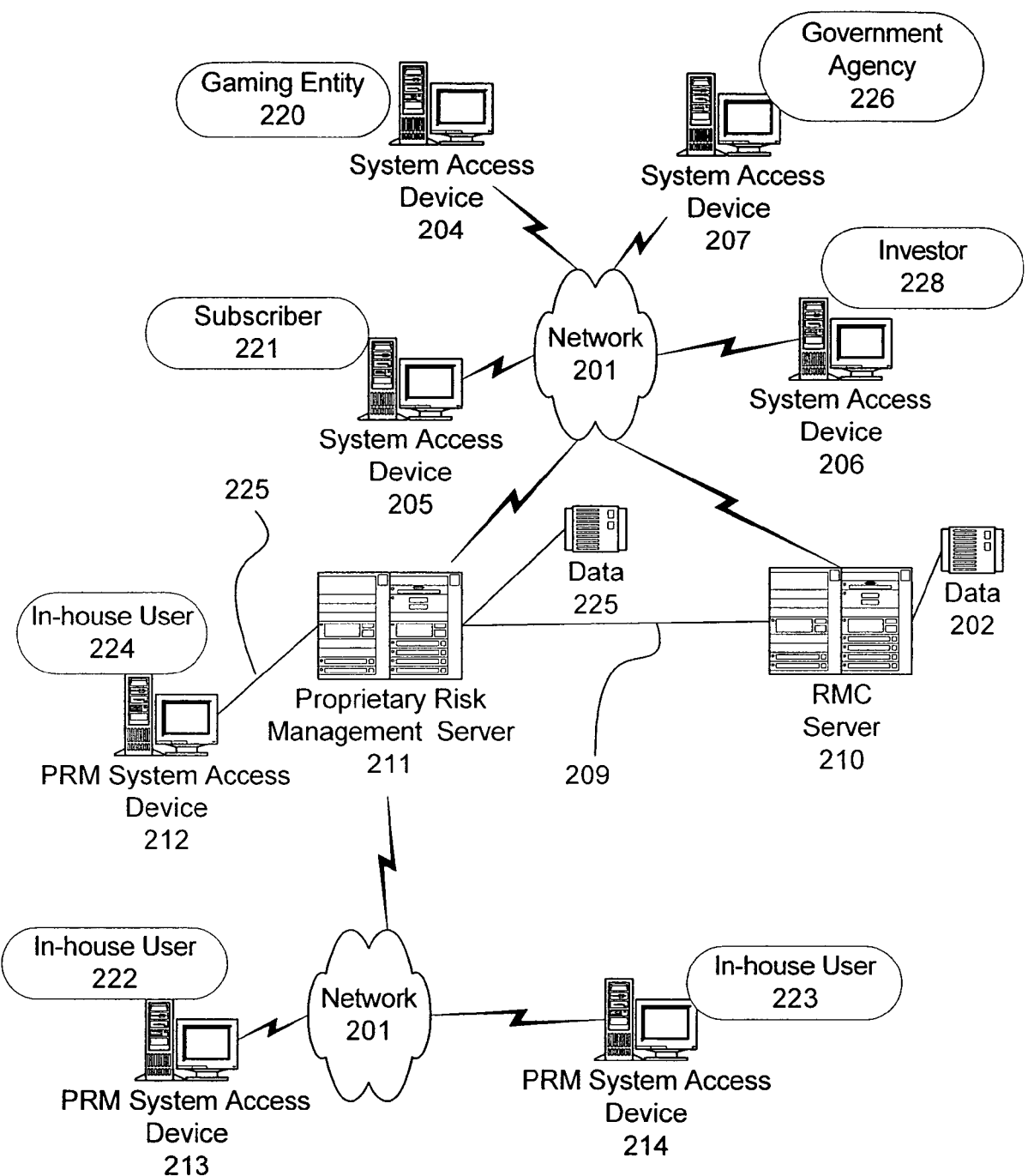
FIG. 2 illustrates a network of computer systems that can embody an automated RMC risk management system.

Referring now to FIG. 2, a network diagram illustrating some embodiments of the present invention is shown 200. An automated RMC 106 can include a computerized RMC server 210 accessible via a distributed network 201 such as the Internet, or a private network. A Subscriber 221, Gaming entity 220, government agency 226, investor 228, or other party interested in Risk management, can use a computerized system or network access device 204-207 to receive, input, transmit or view information processed in the RMC server 210. A protocol, such as the transmission control protocol internet protocol (TCP/IP) can be utilized to provide consistency and reliability.

In addition, a PRM server 211 can access a RMC server 210 via the network 201 or via a direct link 209, such as a T1 line or other high speed pipe. The PRM server 211 can be accessed by an in-house user 222-224 via a system access device 212-214 and a distributed network 201, such as a local area network, or other private network, or even the Internet, if desired. An in-house user 224 can also be situated to access the RMC server 210 via a direct link 225, or any other system architecture conducive to a particular need or situation.

A computerized system or system access device 204-207 212-214 used to access the RMC server 210 or the PRM server 211 can include a processor, memory and a user input device, such as a keyboard, mouse, touch screen or other device and a user output device, such as a display screen and/or printer. The system access devices 204-207, 212-214 can communicate with the RMC server 210 or the PRM server 211 to access data and programs stored at the respective servers 210-211. The system access device 212-214 may interact with the server 210-211 as if the RMC Risk management system 211 were a single entity in the network 200. However, the servers 210-211 may include multiple processing and database sub-systems, such as cooperative or redundant processing and/or database servers that can be geographically dispersed throughout the network 200.

The PRM server 211 includes one or more databases 225 storing data relating to proprietary Risk management. The RMC server 210 and the PRM server 211 may interact with and/or gather data from an operator of a system access device 220-224 226 228 or other source. Data received may be structured according to Risk criteria and utilized to calculate a Risk quotient.

Typically an in-house user 222-224 or other user 220-221, 226, 228 will access the RMC server 210 using client software executed at a system access device 204-207, 212-214. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the RMC server 210 to the network access device 204-207, 212-214 and executed at the system access device 204-207, 212-214 or computer, as part of the RMC Risk management software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
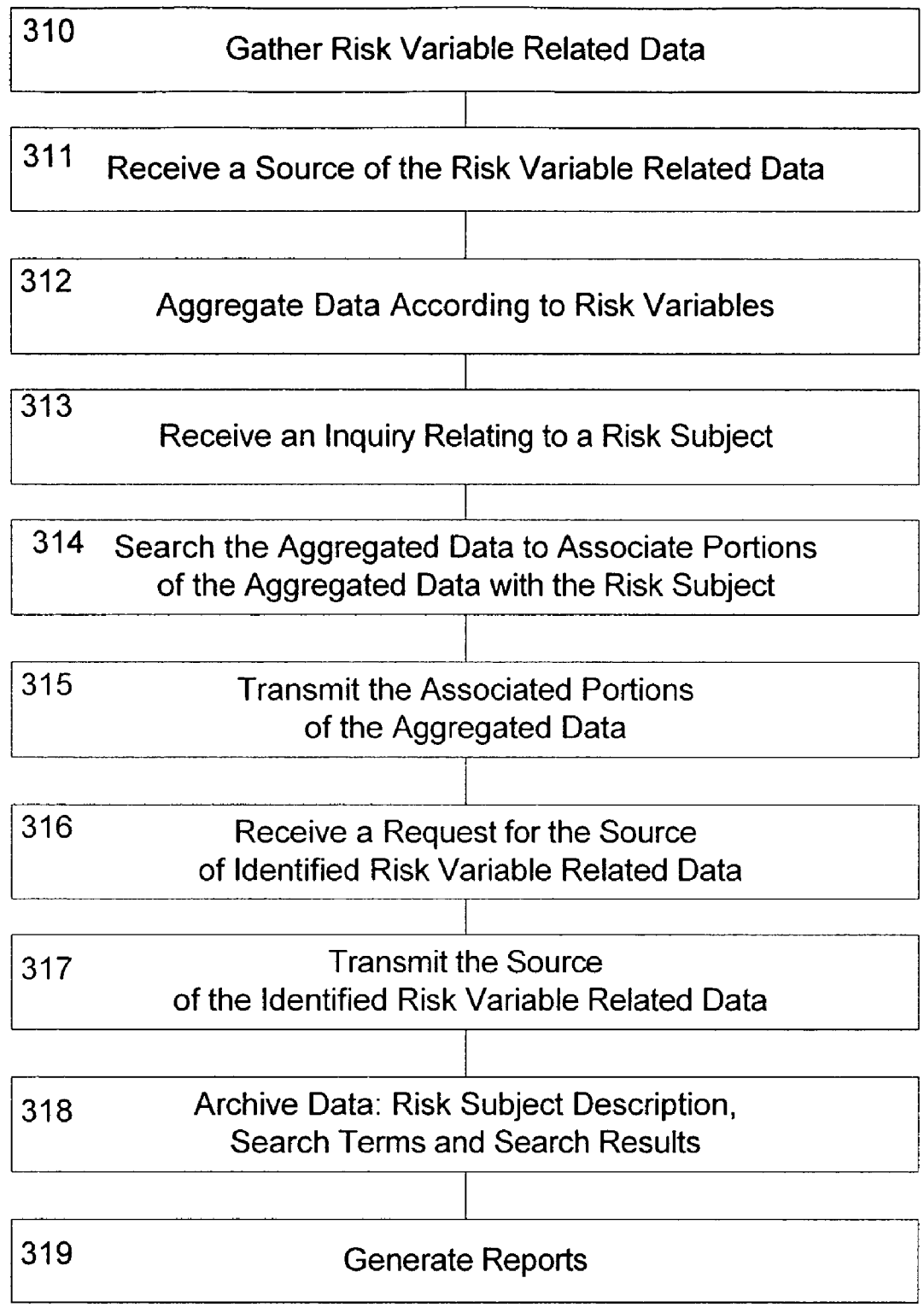
FIG. 3 illustrates a flow of exemplary steps that can be executed by a system implementing the present invention.

Referring now to FIG. 3, steps taken to manage Risks associated with the Gaming Industry can include gathering data relating to Risk entities and other Risk variables 310 and receiving the gathered information into an RMC server 210. Informational data can be gathered from a source of electronic data such as, for example: an external database, a messaging system, a news feed, a government agency, any other automated data provider, an private investigation firm, a court reporter, a state regulator, an insurance company, the Gaming Industry facility, the Gaming Industry provider, the Gaming Industry recipient, a party associated with the Gaming Industry recipient, or other source. Information can be received on an ongoing basis such that if new events occur in the world that affect the Risk associated with the Gaming Industry facility or Gaming Industry provider, the calculated Risks can be adjusted accordingly.

A source of Risk variable data can also be received 311 by the RMC server 210 or other provider of Risk management related data. For example, a source of Risk variable data may include a government agency, an investigation firm, public records, news reports, publications issued by a commercial insurer, other government and non-government organizations, internet websites, news feeds, commercial databases, or other information sources.

The RMC server 210 can aggregate the data received according to Gaming Industry Risk variables 312 or according to any other data structure conducive to fielding Gaming Industry related Risk.

A RMC server 210 can be accessed in real time, or on a periodic basis. In real time embodiments, any changes to the RMC data 108 may be automatically forwarded to a Subscriber 111 or an in-house PRM system 106. Embodiments utilizing periodic access, the RMC system 106 can be scheduled to receive queries at set intervals.

All data received can be combined and aggregated 312 to create an aggregate source of data which can be accessed to perform Risk management activities. Combining data can be accomplished by any known data manipulation method. For example, the data can be maintained in separate tables and linked with relational linkages, or the data can be gathered into on comprehensive table or other data structure. In addition, if desired, information received can be associated with one or more variables including a number of violations received during a time period and the type of violation; a quantity of complaints filed and the reason for such complaints; any fines levied against the Gaming Industry facility and/or provider; employment history of a key employee of a Gaming Industry provider; a record of conviction for any employee of an Gaming Industry provider; types of gambling offered by the Gaming Industry provider; affiliations of a Gaming Industry facility, which can include both domestic and foreign affiliates; financial statements relating to the Gaming Industry facility or Gaming Industry provider; any instances of making accounts available form one facility to another facility on an international basis, any records relating to bankruptcy associated with an Gaming Industry provider, or other data.

The RMC server 210 or PRM server 211 can receive an inquiry relating to a Risk subject 313. The Risk subject can be any subject related to the variables discussed above, for example, a Risk subject can include the Gaming Industry facility, the Gaming Industry provider, the name of the Gaming Industry provider employee, or other related subject.

The inquiry from a Subscriber 111, or other authorized entity, can cause the respective servers 210-211 to search the aggregated data 108 and associate related portions of aggregated data 108 with the Risk subject 314. The associated portions of aggregated data 108 can be transmitted 315 to a party designated by the requesting Subscriber 111.

The RMC server 210 or PRM server 211 may also receive a request for a source of identified Risk variable related data 316, in which case, the RMC server 210 or PRM server 211 can transmit the source of the identified Risk variable related data to the requestor 317. The source may be useful in ascertaining the credibility of the Risk variable related data, to follow up with a request for additional information or other purpose.

A RMC server 210 or PRM server 211 can also store in memory, or otherwise archive Risk management related data 108 and proceedings 318. Archived Risk management related data and proceedings can be useful to demonstrate historical perspective or quantify due diligence efforts relating to high Risk situations. Accordingly, reports quantifying risk subjects researched, Risk management procedures, executed due diligence, corporate governance or other matters can be generated 319.

Figure 4:
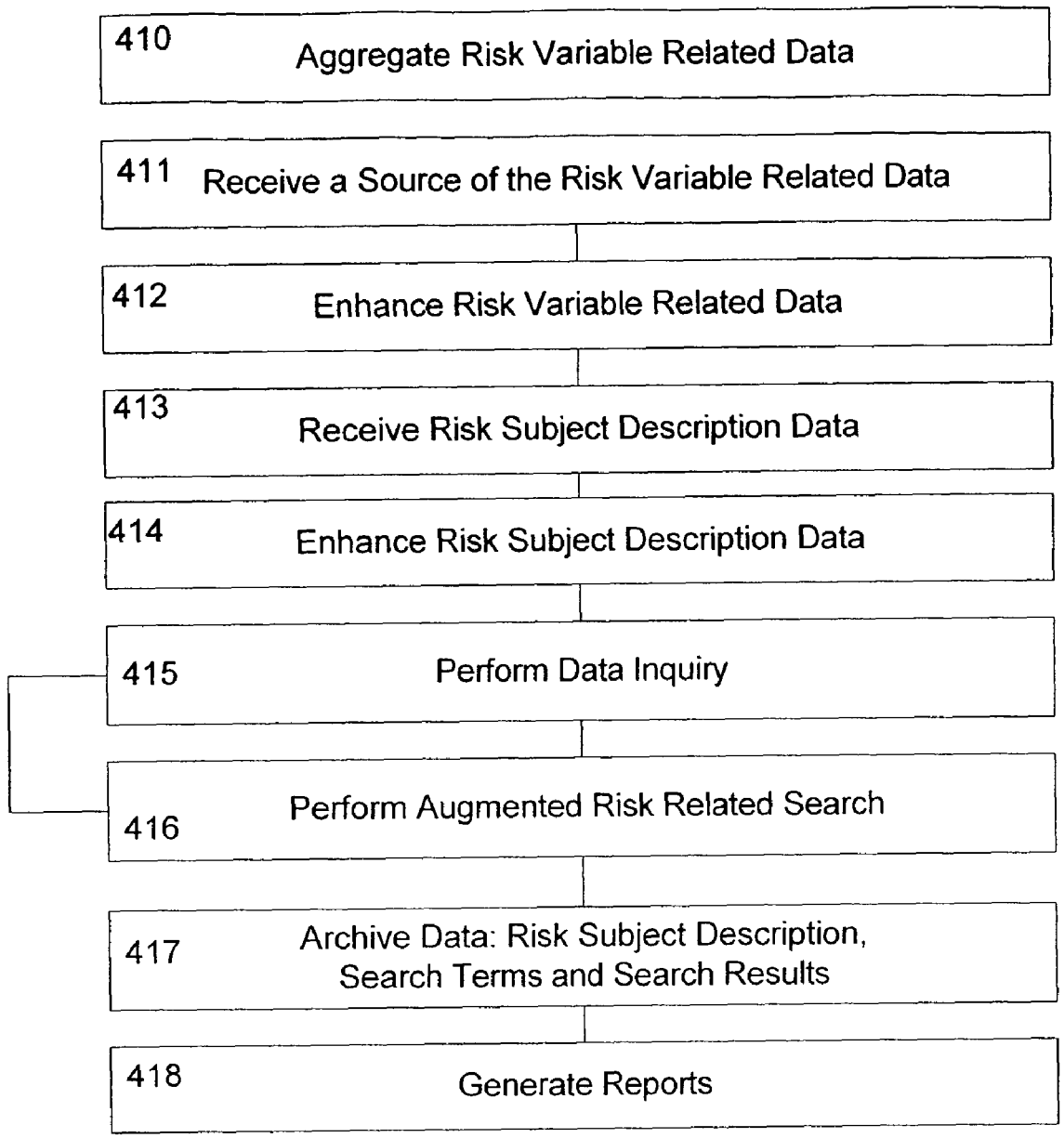
FIG. 4 illustrates a flow of exemplary steps that can be executed by a system to implement augmented data.

Referring now to FIG. 4, the present invention can also include steps that allow an RMC server 210 or PRM server 211 to provide data augmenting functionality that allows for more accurate processing of data related to Risk management. Accordingly, a RMC server 210 or PRM server 211 can aggregate Risk variable related data 410 and also the source of the Risk variable related data 411. The RMC server 210 or PRM server 211 can also enhance the Risk variable related data, such as through data scrubbing techniques or indexing as discussed above. A Risk subject description can also be received 413 and also scrubbed or otherwise enhanced 414.

An inquiry can be performed against the aggregated and enhanced data 415. In addition, an augmented search that incorporates data mining techniques 416 can also be included to further expand the depth of knowledge retrieved by the inquiry. If desired, a new inquiry can be formed as a result of the augmented search. This process can continue until the inquiry and augmentation ceases to add any additional meaningful value.

As discussed above, any searching and augmentation can be archived 417 and reports generated to quantify the due diligence efforts 418.

Figure 5:
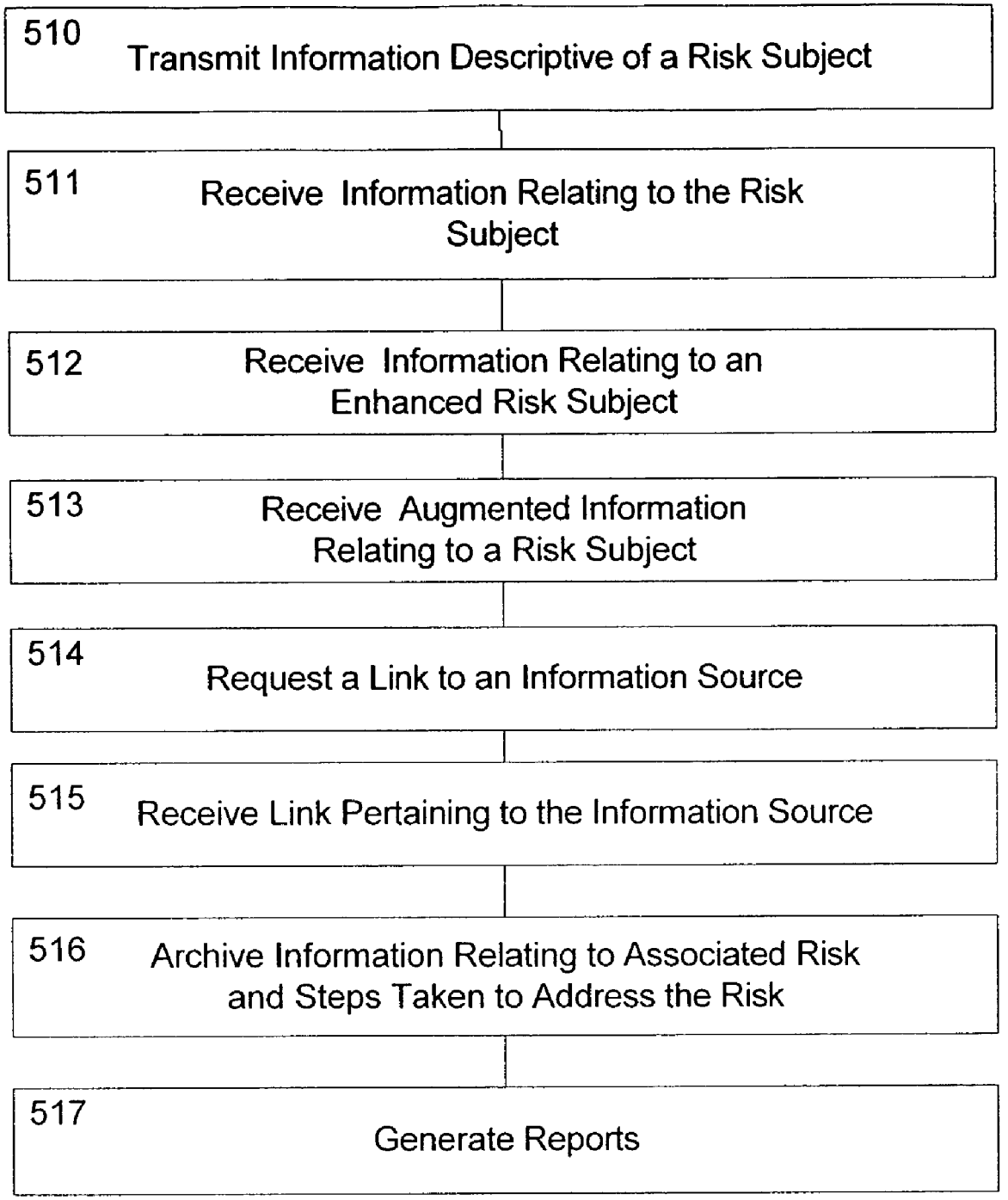
FIG. 5 illustrates a flow of exemplary steps that can taken by a user of the RMC risk management system.

Referring now to FIG. 5, a flow chart illustrates steps that a user, such as a Subscriber 111, can implement to manage Risk associated with a transaction or other Risk related event. The user can receive information descriptive of a Risk subject, such as an entity associated with Gaming Industry 510. The user can access an RMC server 210 and identify to the RMC server 210 one or more Risk variables or search subjects related to Gaming Industry 511. Access can be accomplished by opening a dialogue with an RMC system 211 with a network access device, 204-207, 212-214. Typically, the dialogue would be opened by presenting a GUI to a network access device accessible by a person or an electronic feed that will enter information relating to the transactor. The GUI will be capable of accepting data input via a network access device. An example of a GUI would include a series of questions relating to the Gaming Industry variable. Alternatively, information can be received directly into fields of a database 108, such as from a commercial data source.

In some embodiments, automated monitoring software can run in the background of a normal transaction program and screen data traversing an application. The screened data can be processed to determine key words wherein the key words can in turn be presented to the RMC server 210 as Risk subjects or Risk variables. The RMC server 210 will process the key words to identify entities or other Risk variables. Monitoring software can also be installed to screen data traversing a network or communications link.

For example, monitoring software may be utilized in conjunction with software utilized for investment applications, public relations applications, business transactions, political or charitable donations or other at Risk activities. The monitoring software can screen data and automatically implement Risk searches related to the Gaming Industry.

The user will receive back information relating to Risk associated with the submitted subject 512. Embodiments can allow information to include images of documents, structured data, enhanced data, such as scrubbed data, or other type of data presentation. In some embodiments, a user can receive data resulting from ongoing monitoring of key words, identified entities, gaming facility, gaming provider or other subject, or list of subjects. Any updated information or change of status detected via an ongoing monitoring can result in an alarm or other alert being sent to one or more appropriate recipients. A user can also receive augmented information 513, such as data that has been processed through data mining techniques discussed above.

In addition to receiving augmented information 513, a user can also request an identifier, such as a link, to a source of information 514. Receipt of a link or contact information pertaining to a source of information 515 may be useful to pursue more details relating to the information, or may be utilized to help determine the credibility of the information received.

A user can also cause an archive to be created relating to the Risk management 516. An archive may include, for example, information received relating to Risk associated with a Gaming Industry facility or provider, inquiries made and results of each inquiry. In addition, the user can cause an RMC server 210 to generate reports to quantify the archived information and otherwise document diligent actions taken relating to Risk management 517.

Figure 6:
FIG. 6 is a table illustrating an exemplary data structure of a customer routing database for use in the present invention.

Referring now to FIG. 6, a portion of a data structure that can be utilized with some embodiments of the present invention is illustrated. The data structure 600 can include, for example, a data field for storing risk variables 602, a data field for storing the Gaming Industry company or other provider 604, a data filed for storing a description of a publication or other document description 606, a data field for storing a description of an identification of a source of information 608, or other data fields. Data structures 600 can include relational data, hierarchical data, flat files or other formats known in the arts.

A number of embodiments of the present invention have been described. Nevertheless, it will be understood that various modifications may be made without departing from the spirit and scope of the invention. For example, a RMC server 210 can be made available on the Internet and receive input descriptive of a risk subject or be made available through a commercial information provider. In addition, the Gaming Industry related risk quotient can be compared to a threshold level of Risk generally acceptable for a particular circumstance. Accordingly, other embodiments are within the scope of the following claims.

What is claimed is:

1. A processor implemented method for managing risk related to the Gaming Industry, the method comprising:
   indicating in a computer system that a risk subject is a Gaming Industry entity according to the entity's status comprising at least one of: a provider of gambling activities, a gambling facility, a gambling facility operator, an employee of a gambling facility operator, and a provider of services outsourced from a gambling facility operator;
   receiving into the computer system Gaming Industry related informational artifacts with data associated with reputational risk, legal risk, regulatory risk, and risk related to monetary costs to defend an adverse legal position;
   receiving into the computer system data descriptive of a Financial Transaction wherein the data received comprises identification data for the Gaming Industry entity associated with the Financial Transaction;
   associating by a processor at least one informational artifact related to the Gaming Industry entity associated with the Financial Transaction and reputational risk, legal risk, regulatory risk, and risk related to monetary costs to defend an adverse legal position with the Gaming Industry entity associated with the Financial Transaction;
   generating via the processor a risk quotient comprising a quantitative value of an amount of Gaming Industry related Risk, wherein calculating the risk quotient criteria comprises a processor-determined value through:
      associating a numerical weight with each of a plurality of risk variables;
      associating one or more of the risk variables with the data descriptive of details of a Financial Transaction;
      determining a numerical value based upon the content of the data descriptive of details of a Financial Transaction associated with the one or more risk variables; and
      multiplying the numerical value based upon the content by the numerical weight associated with each of the risk variables associated with the data descriptive of details of a Financial Transaction; and
   generating via the processor a report comprising data descriptive of the informational artifacts associated with the Gaming Industry entity associated with the Financial Transaction.

2. The method of claim 1 wherein the Financial Transaction comprises a financial investment in at least one of: a gambling facility and a gambling facility operator.

3. The method of claim 1 wherein the risk quotient comprises an indication of a cost to defend an adverse position.

4. The method of claim 1 wherein the risk quotient comprises an indication an amount of reputational risk.

5. The method of claim 1 wherein the risk quotient comprises an indication of an amount of regulatory risk.

6. The method of claim 1 wherein the risk quotient comprises an indication of an amount of legal risk.

7. The method of claim 1 wherein the risk quotient comprises an indication of an amount of risk associated with monetary costs related to potential fines.

8. The method of claim 1 wherein the data descriptive of informational artifacts comprises data descriptive of one or more world events which is received via a news feed.

9. The method of claim 1 wherein the data descriptive of informational artifacts comprises at least one government advisory.

10. The method of claim 1 additionally comprising presenting the report as evidence of due diligence to at least one of: a regulatory body, a shareholder and a news media.

11. The method of claim 1 additionally comprising generating a suggested action based upon the risk quotient and at least some of the structured data referenced to calculate the risk quotient.

12. The method of claim 1 wherein the data descriptive of informational artifacts comprises data descriptive of a person employed by a Gaming Industry entity.

13. The method of claim 1 wherein the data descriptive of informational artifacts comprises data descriptive of at least a portion of one or more of: a federal or state statute a federal or state regulation, the Federal Register, instances of political corruption, a license to permit gambling, a link to organized crime, a money laundering activity, an action taken by a State Gaming Commission, and an action taken by the Judiciary Committee.

14. The method of claim 1 wherein the data descriptive of informational artifacts comprises data descriptive of at least a portion of one or more of: an action taken by the House Government Reform Committee, an action taken by the Senate Governmental Affairs Committee, an action taken by the Senate Select Indian Affairs Committee, an action taken by the U.S. Treasury, and an action taken by the General Accounting Office.

15. The method of claim 1 wherein transmitting the report is conditioned upon receipt of a contractual obligation not to use contents of the report for any purpose covered by the Fair Credit Reporting Act.

16. The method of claim 1 wherein the report comprises a record of conviction of an employee or owner of a Gaming Industry facility.

17. The method of claim 1 wherein the report comprises data descriptive of at least one of: fines levied against a Gaming Industry facility and complaints filed against the facility.

18. The method of claim 1 wherein the report comprises one or more sources of the data descriptive of informational artifacts.

19. The method of claim 18 wherein the source comprises an investigation firm.

20. The method of claim 1 additionally comprising transmitting an image of a document comprising data associated with the Financial Transaction.

21. The method of claim 1 wherein report does not comprise any content created or developed by a provider of the system implementing the method for managing risk associated with the Gaming Industry.

22. The method of claim 1 additionally comprising:
receiving a request for an alert; monitoring the data descriptive of informational artifacts; and transmitting a notification of new information received associated with a particular Gaming Industry risk subject.

23. The method of claim 1 wherein the data descriptive of informational artifacts is received into a risk management clearinghouse.

24. The method of claim 1 wherein the data descriptive of details of a Financial Transaction is received by a proprietary risk management system.

25. The method of claim 1 wherein at least one of: the data descriptive of informational artifacts and the data descriptive of details of a Financial Transaction, comprise data provided by a Gaming Industry facility provider.

26. The method of claim 1 additionally comprising enhancing the data descriptive of informational artifacts.

27. The method of claim 26 wherein enhancing the data comprises scrubbing the data to incorporate changes in the spelling of words comprising the data descriptive of informational artifacts as compared to the data descriptive of details of a Financial Transaction.

28. The method of claim 1 additionally comprising augmenting at least one of: the data descriptive of informational artifacts and the data descriptive of details of a Financial Transaction, via data mining.

29. The method of claim 1 wherein structuring the data descriptive of informational artifacts and the data relating details of the Financial Transaction according to risk quotient criteria comprises processes based upon Boolean logic.

30. The method of claim 1 wherein structuring the data descriptive of informational artifacts and the data relating details of the Financial Transaction according to risk quotient criteria comprises relevance ranking.

31. A computerized system for managing risk associated with the Gaming Industry, the system comprising:
a memory;
a processor disposed in communication with said memory, and configured to issue a plurality of processing instructions stored in the memory, wherein the processor issues instructions to:
indicate in a computer system that a risk subject is a Gaming Industry entity according to the entity's status comprising at least one of: a provider of gambling activities, a gambling facility, a gambling facility operator, an employee of a gambling facility operator, and a provider of services outsourced from a gambling facility operator;
receive into the computer system Gaming Industry related informational artifacts with data associated with reputational risk, legal risk, regulatory risk, and risk related to monetary costs to defend an adverse legal position;
receive into the computer system data descriptive of a Financial Transaction wherein the data received comprises identification data for the Gaming Industry entity associated with the Financial Transaction;
associate at least one informational artifact related to the Gaming Industry entity associated with the Financial Transaction and reputational risk, legal risk, regulatory risk, and risk related to monetary costs to defend an adverse legal position with the Gaming Industry entity associated with the Financial Transaction;
generate by a processor a risk quotient comprising a quantitative value of an amount of Gaming Industry related Risk, wherein calculating the risk quotient criteria comprises a value determined through:
associating a numerical weight with each of a plurality of risk variables;
associating one or more of the risk variables with the data descriptive of details of a Financial Transaction;

determining a numerical value based upon the content of the data descriptive of details of a Financial Transaction associated with the one or more risk variables; and multiplying the numerical value based upon the content by the numerical weight associated with each of the risk variables associated with the data descriptive of details of a Financial Transaction; and generate a report comprising data descriptive of the informational artifacts associated with the Gaming Industry entity associated with the Financial Transaction.

32. A processor-readable medium storing a plurality of processor-issuable instructions, comprising instructions to:

indicate in a computer system that a risk subject is a Gaming Industry entity according to the entity's status comprising at least one of: a provider of gambling activities, a gambling facility, a gambling facility operator, an employee of a gambling facility operator, and a provider of services outsourced from a gambling facility operator;

receive into the computer system Gaming Industry related informational artifacts with data associated with reputational risk, legal risk, regulatory risk, and risk related to monetary costs to defend an adverse legal position;

receive into the computer system data descriptive of a Financial Transaction wherein the data received comprises identification data for the Gaming Industry entity associated with the Financial Transaction;

associate via a processor at least one informational artifact related to the Gaming Industry entity associated with the Financial Transaction and reputational risk, legal risk, regulatory risk, and risk related to monetary costs to defend an adverse legal position with the Gaming Industry entity associated with the Financial Transaction;

generate via the processor a risk quotient comprising a quantitative value of an amount of Gaming Industry related Risk, wherein calculating the risk quotient criteria comprises a value determined through:

associating a numerical weight with each of a plurality of risk variables;

associating one or more of the risk variables with the data descriptive of details of a Financial Transaction;

determining a numerical value based upon the content of the data descriptive of details of a Financial Transaction associated with the one or more risk variables; and multiplying the numerical value based upon the content by the numerical weight associated with each of the risk variables associated with the data descriptive of details of a Financial Transaction; and generate via the processor a report comprising data descriptive of the informational artifacts associated with the Gaming Industry entity associated with the Financial Transaction.

* * * * *